(12) United States Patent
Guo et al.

(10) Patent No.: US 8,466,936 B2
(45) Date of Patent: Jun. 18, 2013

(54) COLOR GAMUT MAPPING METHOD FOR MULTIMEDIA EQUIPMENT, A TELEVISION AND A COLOR PROCESSING APPARATUS

(75) Inventors: Dabo Guo, Qingdao (CN); Weidong Liu, Qingdao (CN); Yingshuai Liu, Qingdao (CN)

(73) Assignees: Hisense Beijing Electric Co., Ltd. (CN); Hisense Group Co., Ltd. (CN); Hisense Electric Co., Ltd. (CN)

( * ) Notice: Subject to any disclaimer, the term of this patent is extended or adjusted under 35 U.S.C. 154(b) by 1275 days.

(21) Appl. No.: 12/255,419

(22) Filed: Oct. 21, 2008

(65) Prior Publication Data

US 2010/0097405 A1    Apr. 22, 2010

(51) Int. Cl.
G09G 5/10    (2006.01)

(52) U.S. Cl.
USPC ............ 345/690; 345/589; 345/590; 345/591

(58) Field of Classification Search
USPC .................................. 345/690, 589, 590, 591
See application file for complete search history.

(56) References Cited

U.S. PATENT DOCUMENTS

2009/0009539 A1 *   1/2009   Ahn et al. ..................... 345/690

FOREIGN PATENT DOCUMENTS

CN    101169928 A    4/2008

* cited by examiner

*Primary Examiner* — Amare Mengistu
*Assistant Examiner* — Joseph G Rodriguez
(74) *Attorney, Agent, or Firm* — Knobbe Martens Olson & Bear, LLP

(57) ABSTRACT

A color gamut mapping method for multimedia equipment is disclosed. This method performs color gamut mapping on a video signal received by the multimedia equipment and gives an output, wherein the video signal is in a first color gamut while display light of the multimedia equipment is in a second color gamut. The color gamut mapping method for multimedia equipment comprises the steps of: converting the received video signal into a luminance signal and a chrominance signal, and calculating a two-dimensional plane according to the luminance signal and the chrominance signal, wherein the two-dimensional plane intersects the first color gamut to obtain a first region and intersects the second color gamut to obtain a second region; calculating location of a to-be-mapped point corresponding to the video signal in the first region according to the luminance signal and the chrominance signal of the video signal, and calculating a mapping point in the second region by making calculations on the to-be-mapped point to output a mapping point signal.

17 Claims, 2 Drawing Sheets

US 8,466,936 B2

COLOR GAMUT MAPPING METHOD FOR MULTIMEDIA EQUIPMENT, A TELEVISION AND A COLOR PROCESSING APPARATUS

BACKGROUND OF THE INVENTION

1. Technical Field

The present invention relates to the field of video signal display processing, and more particularly, relates to a color gamut mapping method for multimedia equipment, and a television and a color processing apparatus using the color gamut mapping method.

2. Description of Related Technology

Currently in the field of video signal display, as video source equipment that makes a video image is usually different from equipment that receives and plays the video image, difference in color of the video image occurs between the two kinds of equipment. This necessitates the use of a color management system for enabling the same video image to present identical color effect in different displays, thereby ensuring consistency of the color. Such a color management system is mainly configured to perform color mapping on video signals received, including color space conversion and color gamut mapping.

Color space conversion refers to conversion of a color representation from a color space to another, e.g., conversion among color spaces such as RGB, CMYK and CIELAB. Color gamut mapping refers to mapping of video signals received by the video equipment to obtain video signals with correct color reproduction.

At present, color space conversion and color gamut mapping technologies find most applications in the printing industry. In the field of video display, a multimedia apparatus (e.g., a display, a television, a digital camera, a digital video camera or the like) generally adopts an RGB signal drive circuit as a drive circuit of the display unit thereof, and the multimedia apparatus performs color adjustment on RGB color signals transmitted by the drive circuit before transmitting them for display on the display unit. The concrete color adjustment mainly involves color gamut mapping, which is accomplished through the following process: creating an independent color adjustment shade difference correspondence table, a masstone saturation mapping correspondence table and a multi-layer luminance switching correspondence table, and performing color gamut mapping of optimal color characteristics separately or simultaneously as required. Then a user inputs adjustment values by viewing or measuring adjustment patterns on the display unit, and associates the adjustment values with the created tables in one-to-one correspondence, thereby to accomplish the effect of color gamut mapping and independent color adjustment.

More information related to the above technical scheme can be found in China Patent No. CN200610136648.7.

In the above technical scheme, however, not only computations implemented to accomplish the color adjustment are very rough, but also image quality thus obtained still suffer from distortion.

BRIEF SUMMARY OF CERTAIN INVENTIVE ASPECTS

One objective of the present invention is to provide a color gamut mapping method for multimedia equipment and a television, which are capable of outputting images of good quality.

To this end, the present invention adopts the following technical scheme. In a first aspect, the present invention provides a color gamut mapping method for multimedia equipment, which performs color gamut mapping on a video signal received by the multimedia equipment and gives an output. The video signal is in a first color color gamut, while display light of the multimedia equipment is in a second color gamut. This color gamut mapping method for multimedia equipment comprises the steps of: converting the received video signal into a luminance signal and a chrominance signal, and calculating a two-dimensional plane according to the luminance signal and the chrominance signal, wherein the two-dimensional plane intersects the first color gamut to obtain a first region and intersects the second color gamut to obtain a second region; calculating location of a to-be-mapped point corresponding to the video signal in the first region according to the luminance signal and the chrominance signal of the video signal, and calculating a mapping point in the second region by making calculations on the to-be-mapped point to output a mapping point signal.

In a second aspect, the present invention provides a television comprising a color gamut mapping apparatus for performing color gamut mapping on a television signal received and giving an output. The television signal is in a first color gamut, while the television displays images with laser that is in a second color gamut. This color gamut mapping apparatus comprises: a converter, configured to convert the received television signal into a luminance signal and a chrominance signal; a two-dimensional plane calculator, configured to calculate a two-dimensional plane according to the luminance signal and the chrominance signal, wherein the two-dimensional plane intersects the first color gamut to obtain a first region and intersects the second color gamut to obtain a second region; a mapper, configured to calculate a to-be-mapped point corresponding to the television signal in the first region according to the luminance signal and the chrominance signal obtained from the converter, and calculate a mapping point in the second region according to the to-be-mapped point to output a mapping point signal.

In a third aspect, the present invention provides a color processing apparatus which performs color gamut mapping on a received video signal and gives an output. The video signal is in a first color gamut, and the color processing apparatus further has a second color gamut. The color processing apparatus further comprises: a converter, configured to convert the received video signal into a luminance signal and a chrominance signal; a two-dimensional plane calculator, configured to calculate a two-dimensional plane according to the luminance signal and the chrominance signal, wherein the two-dimensional plane intersects the first color gamut to obtain a first region and intersects the second color gamut to obtain a second region; a mapper, configured to calculate location of a to-be-mapped point corresponding to the video signal in the first region according to the luminance signal and the chrominance signal obtained from the converter, and calculate a mapping point in the second region according to the to-be-mapped point to output a mapping point signal.

According to the present invention, the received video signal is converted into a luminance signal and a chrominance signal, and a two-dimensional plane is calculated according to the luminance signal and the chrominance signal, wherein the two-dimensional plane intersects the first color gamut to obtain a first region and intersects the second color gamut to obtain a second region; location of a to-be-mapped point corresponding to the video signal in the first region is calculated according to the luminance signal and the chrominance signal of the video signal, and then a mapping point in the second region is calculated according to the to-be-mapped point to output a mapping point signal. In this way, the received video signal will match the display light color gamut of the multimedia equipment, thereby achieving color image display of good quality.

DETAILED DESCRIPTION OF CERTAIN INVENTIVE EMBODIMENTS

To facilitate better understanding of the present invention and to make the aforesaid and other objectives, features and advantages thereof more obvious, the present invention will be further described in detail hereinafter.

The present invention relates to a color mapping method for video signals, which mainly performs color space conversion and color gamut mapping on external video signals received to obtain appropriate color video signals for output. The video signals received are in a format of NTSC, PAL or SECAM.

Figure 1:
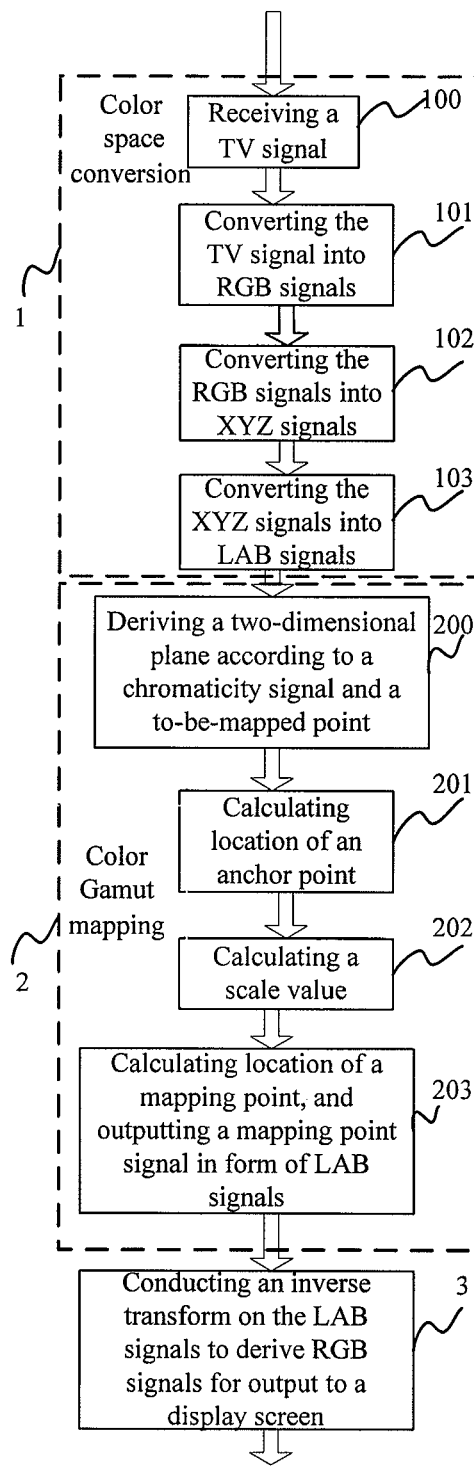
FIG. 1 is a flowchart of an embodiment of a color gamut mapping method for multimedia equipment according to the present invention.

The color mapping method for video signals can decode the received video signals to obtain chrominance signals of the three primary colors. There exist many kinds of three primary colors, for example, the three primary color space represented by R, G, B, the CIE three primary color space represented by L, A, B, the CIE three primary color space represented by L, U, V, and the like. Herein, R, G, B are selected as the chrominance signals of the three primary colors, and the received video signals are decoded to obtain intensity modulation signals of the R, G, B colors. Although color video signals, especially color TV signals, have different encoding modes and different color gamut of the three primary colors (phosphors) due to different formats they adopts, they can all be decoded to generate intensity modulation signals of R, G, B colors. Then color mapping can be performed on the R, G, B signals. Referring to FIG. 1, the concrete mapping process comprises the steps of:

Step S1: color space conversion. Color space conversion refers to conversion of a color representation from a color space to another. More specifically, in the present invention, it refers to conversion of received R, G, B signals to chrominance signals in a target color gamut through a luminance equation. A uniform color space such as the CIE space including CIE1976LAB space or CIE1976LUV space may be selected as the target color gamut space. Selecting a uniform color space is advantageous in that when color difference is larger than the visual resolution and is adequate for color difference between two adjacent levels in the Munsell color system, feeling to color of objects can be reflected better. The CIE1976LUV space is applicable to lighting, TV display, CRT display and other additive color mixture applications.

Taking a television as an example, this comprises the steps of:

Step S100: the television receives a TV signal. Since the TV signal has a fixed color gamut which is a first color gamut, each received TV signal is in the first color gamut. On the other hand, the television itself may display with laser or LED backlight which is therefore in a second color gamut. The laser or LED backlight has a wider color gamut than the inherent first color gamut. Both the first and the second color gamut are shaped like a three-dimensional spindle.

Then the received TV signal is converted into a luminance signal and a chrominance signal, which is accomplished by the following steps:

S101: converting the received TV signal into RGB signals. Multimedia equipment currently available, especially televisions, all use RGB signals to drive the display, so although video signals, especially color TV signals, have different encoding modes and different color gamut of the three primary colors (phosphor) due to different formats they adopts, the video signals can all be decoded to generate intensity modulation signals of R, G, B colors. Here, the RGB signals adopted in the present invention are just representative of video drive signals. Although examples in which other kinds of signals are used to drive multimedia equipment are not excluded herein, the RGB signals set forth herein will encompass any kinds of multimedia equipment drive signals regardless of the drive modes they adopt.

The TV signal is converted into R, G and B coordinate signals, which are then connected with each other to form a triangle. Then signals within the region enclosed by the triangle are converted and calculated to obtain the first color gamut.

Likewise, display light of the television is converted into R, G and B coordinate signals, which are then connected with each other to form a triangle. Then signals within the region enclosed by the triangle are converted and calculated to obtain the second color gamut.

As the second color gamut is determined by inherent property of the display light of the multimedia equipment itself (e.g., a television), the second color gamut may be obtained by performing a conversion on the display light and stored in advance, thereby to increase the operational speed of the system and to perform subsequent color gamut mapping in a faster and better way.

Of course, in consideration of synchronism of the subsequent color gamut mapping operations, the color gamut conversion may also be performed on the display light of the multimedia equipment and the received video signal simultaneously to obtain the second color gamut and the to-be-mapped point. Then the to-be-mapped point is mapped to the second color gamut to obtain the mapping point.

Afterwards, a color gamut type is selected and the converted RGB signals are converted into signals of the selected color gamut type. A uniform color space such as the CIE1976LAB space or CIE1976LUV space may be selected as the color gamut type. Selecting a uniform color space is advantageous in that when color difference is larger than the visual resolution and is adequate for color difference between two adjacent levels in the Munsell color system, feeling to color of objects can be reflected better. The CIE1976LUV space is applicable to lighting, TV display, image display (e.g., in a computer or a cell phone) and other additive color mixture applications. The first and the second color gamut belong to the same color gamut type. As the CIE color space is associated with the XYZ coordinate signals, XYZ coordinate signals are selected to represent the color signals of the three primary colors herein. If the selected color gamut type is associated with other coordinate signals, color signals of the three primary colors can be selected adaptively.

S02: converting the RGB signals into XYZ signals. This is accomplished according to the following formula:

$$X = C_r x_r R + C_g x_g G + C_b x_b B \quad (a)$$
$$Y = C_r y_r R + C_g y_g G + C_b y_b B$$
$$Z = C_r z_r R + C_g z_g G + C_b z_b B$$

wherein:

$$\begin{bmatrix} C_r \\ C_g \\ C_b \end{bmatrix} = \begin{bmatrix} x_r & x_g & x_b \\ y_r & y_g & y_b \\ z_r & z_g & z_b \end{bmatrix}^{-1} \begin{bmatrix} x_n/y_n \\ 1 \\ z_n/y_n \end{bmatrix} \quad (b)$$

$C_r$, $C_g$ and $C_b$ are mapping component factors of the three primary colors, $x_r$, $y_r$ and $z_r$ are chrominance coordinates of the primary color (R), $x_g$, $y_g$ and $z_g$ are chrominance coordinates of the primary color (G), and $x_b$, $y_b$ and $z_b$ are chrominance coordinates of the primary color (B). By substituting the chrominance coordinates of the three primary colors RGB and the reference white chrominance coordinates into Formula (b), values of $C_r$, $C_g$ and $C_b$ can be derived.

S03: expressing the XYZ signals obtained in Step S102 in the selected color gamut space.

If the selected color gamut space is CIE1976Lab, by substituting the color gamut conversion formula (a), we obtain:

$$L^* = \begin{cases} 116(Y/Y_n)^{1/3} - 16 & (Y/Y_n > 0.008856) \\ 903.3 Y/Y_n & (Y/Y_n <= 0.008856) \end{cases}$$

$$a^* = \begin{cases} 500[(X/X_n)^{1/3} - (Y/Y_n)^{1/3}] & (X/X_n > 0.008856) \\ 3893.5[X/X_n - Y/Y_n] & (X/X_n <= 0.008856) \end{cases}$$

$$b^* = \begin{cases} 200[(Y/Y_n)^{1/3} - (Z/Z_n)^{1/3}] & (Z/Z_n > 0.008856) \\ 1557.4[Y/Y_n - Z/Z_n] & (Z/Z_n <= 0.008856) \end{cases}$$

where L* denotes a lightness signal, a* and b* denote chrominance signals which are coordinates in the color space respectively. If the selected color gamut space is CIE1976Luv, by substituting the color gamut conversion formula (a), we obtain:

$$L^* = \begin{cases} 116(Y/Y_n)^{1/3} - 16 & \text{If } Y/Y_n > 0.008856 \\ 903.3(Y/Y_n)^{1/3} & \text{If } Y/Y_n <= 0.008856 \end{cases}$$

$$u^* = 13L^*(u' - u'_n)$$
$$v^* = 13L^*(v' - v'_n)$$
$$u' = 4X/(X + 15Y + 3Z)$$
$$v' = 9Y/(X + 15Y + 3Z)$$
$$u'_n = 4X_n/(X_n + 15Y_n + 3Z_n)$$
$$v'_n = 9Y_n/(X_n + 15Y_n + 3Z_n)$$

where L* denotes a lightness signal, u* and v* denote chrominance signals which are coordinates in the color space respectively. $(X_n Y_n Z_n)$ denote white tristimulus values reflected into a viewer's eyes when a CIE standard illuminator illuminates a full reflector, where $Y_n = 100$.

The method of converting a received TV signal into a luminance signal and a chrominance signal according to the present invention described above has an advantage that it can perform uniform color conversion on video signals, especially TV signals, of different formats all over the word.

Step S2: color gamut mapping. It comprises the steps of:
A two-dimensional plane is calculated according to the luminance signal and the chrominance signal obtained from the color space conversion of Step S1, wherein the two-dimensional plane intersects the first color gamut to obtain a first region and intersects the second color gamut to obtain a second region. The two-dimensional plane may be a two-dimentional lightness-chromaticity plane, a two-dimensional lightness-hue angle plane or a two-dimensional hue angle-chromaticity plane.

In case of a two-dimentional lightness-chromaticity plane, if the selected color gamut space is the CIE1976Lab space, the two-dimensional plane is obtained according to the hue angle n=arctan b*/a*; and if the selected color gamut space is the CIE1976Luv space, the two-dimensional plane is obtained according to the hue angle n=arctan v*/u*. Preferably, the two-dimentional lightness-chromaticity plane is selected in the present invention.

In case of a two-dimensional lightness-hue angle plane, if the selected color gamut space is the CIE1976Lab space, the two-dimensional plane is obtained according to the chromaticity $C^* = (a^{*2} + b^{*2})^{1/2}$. As shown in Step S200, a two-dimensional plane is obtained according to the chromaticity signal and the to-be-mapped point.

Alternatively, if the selected color gamut space is the CIE1976Luv space, the two-dimensional plane is obtained according to the chromaticity $C^* = (u^{*2} + v^{*2})^{1/2}$.

In case of a two-dimensional hue angle-chromaticity plane, if the selected color gamut space is the CIE1976Lab space, the two-dimensional plane is obtained according to the lightness signal; and if the selected color gamut space is the CIE 1976Luv space, the two-dimensional plane is obtained also according to the lightness signal.

To obtain the desired two-dimensional plane in a faster and better way, a one-dimensional look-up table may be created for the two-dimensional plane. More specifically, the look-up table divides an angular range [0, 360°] of the two-dimensional plane into h equant two-dimensional planes, each corresponding to an angle of 360°/h, where h≧360n, n≧1. Here, h may have a value of 360, 720, 1440, etc. and h is an integer;

If a two-dimensional lightness-chromaticity plane is selected, a hue angle is calculated for each two-dimensional plane, so a corresponding two-dimensional plane can be derived directly from the hue angle. If a lightness-hue angle two-dimensional plane is selected, a chromaticity is calculated for each two-dimensional plane, so a corresponding two-dimensional plane can be derived directly from the chromaticity. Likewise, if a lightness-chromaticity two-dimensional plane is selected, a hue angle is calculated for each two-dimensional plane, and a corresponding two-dimensional plane can be derived directly from the lightness. In case calculated hue angle data does not appear in the look-up table when the two-dimensional lightness-chromaticity plane is selected, an interpolation may be performed on the calculated hue angle data, a hue angle closest to this hue angle is searched in the one-dimensional look-up table, and then a two-dimensional plane is obtained according to the found hue angle. Similarly, the interpolation operation may be applied to two-dimensional planes of other kinds.

The one-dimensional look-up table and data of the two-dimensional plane in the look-up table may be calculated in advance and stored in a signal processing system of the multimedia equipment.

The two-dimensional plane intersects the first color gamut to obtain a first region, and intersects the second color gamut to obtain a second region.

Figure 2:
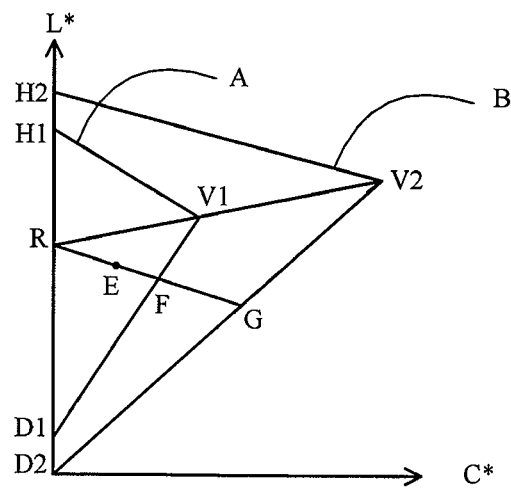
FIG. 2 is a schematic view illustrating an embodiment of color gamut mapping in the color gamut mapping method for multimedia equipment according to the present invention.

Points with the largest horizontal coordinates in the first and the second regions are calculated respectively and connected by a line. A point where this line. intersects the longitudinal axis is defined as an anchor point. Then a line is drawn from the anchor point to the to-be-mapped point, which intersects a boundary of the first region at a first boundary point and intersects a boundary of the second region at a second boundary point. A ratio of a distance between the anchor point and the second boundary point to that between the anchor point and the first boundary point is defined as a scale value, and a mapping point can be derived by multiplying the to-be-mapped point with the scale value. Taking a two dimensional lightness-chromaticity plane as an example, points with the largest chromaticity coordinates in the first and the second regions may be calculated respectively and connected by a line. A point where this line intersects the lightness axis is defined as an anchor point. Then a line is drawn from the anchor point to the to-be-mapped point, which intersects a boundary of the first region at a first boundary point and intersects a boundary of the second region at a second boundary point. A ratio of a distance between the anchor point and the second boundary point to that between the anchor point and the first boundary point is defined as a scale value, and a mapping point can be derived by multiplying the to-be-mapped point with the scale value. Referring to FIG. 2 for more details, in the two-dimensional lightness-chromaticity plane, a horizontal axis C* represents the chromaticity axis while a longitudinal axis L* represents the lightness axis. A first region A has a point V1 with the largest chromaticity coordinate, and a second region B has a point V2 with the largest chromaticity coordinate. A line is drawn from the point V1 to the point V2, and a point R where this line intersects the lightness axis L* is defined as the anchor point. In this two-dimensional plane, location of the to-be-mapped point E is known; to be more specific, its location is represented by the L*, a* and b* signals already calculated previously. A line connecting the anchor point R and the to-be-mapped point E intersects a boundary of the first region A at a first boundary point F, and intersects a boundary of the second region B at a second boundary point G. A scale value K is defined as a ratio of a distance between the anchor point R and the second boundary point G to that between the anchor point R and the first boundary point F. A mapping point can be derived by multiplying the to-be-mapped point E with the scale value K.

To accelerate the processing operations of the system and find the corresponding scale value as quickly as possible, an angular range of [−90°, 90°] of the scale value in the two-dimensional plane is divided into m sub-ranges, where m≧180n, n≧1. Here, m may have a value of 180, 320, 540, 720, etc. and m is an integer. All scale values are calculated and stored in advance, and then an angle included between the line from the anchor point R to the to-be-mapped point E and a horizontal line crossing the anchor point R is calculated to derive a corresponding scale value. Here, the range of [−90°, 90°] is defined by taking the anchor point R as an imaginary origin. The angle included between the line from the anchor point R to the to-be-mapped point E and a horizontal line crossing the anchor R can be calculated directly. Alternatively, a coordinate transform may be conducted on the entire two-dimensional plane to obtain data that is based on the imaginary origin R, from which the scale value and location of the matching point are derived. Then an inverse coordinate transform is conducted to revert to coordinates in the original plane.

In this way, by combining the one-dimensional look-up table created for the two-dimensional plane with the data and scale values thus obtained, a two-dimensional look-up table can be created. For example, data of the two-dimensional plane is derived from the hue angle, and a scale value is derived from the angle included between the line from the anchor point and the to-be-mapped point and the horizontal line crossing the anchor. Then location of a mapping point in the second color gamut is derived from the scale value, and a mapping point signal is outputted in Step S203. At this time, as the mapping point signal is still in form of LAB signals, an additional step S3 is needed in which an inverse transform is conducted on the LAB signals to obtain RGBs signal for output to a display screen. The inverse transform operations are in one-to-one correspondence to the transform operations for transforming the RGB signals into the LAB signals.

On basis of the color mapping method for video signals described above, the present invention also proposes a corresponding multimedia equipment, e.g., a television. This television is configured to convert received TV signals into TV signals of a uniform format. The received TV signals may be video signals in a format of NTSC, PAL or SECAM. The television of the present invention is mainly configured to perform color space conversion and color gamut mapping on an external TV signal received to obtain a color TV signal appropriate for color gamut output of the television itself and then output the color TV signal to the display.

This television comprises a color gamut mapping apparatus, which is configured to decode a received TV signal into chrominance signals of the three primary colors and converts the chrominance signals of the three primary colors into chrominance signals in a target color gamut space through a luminance equation. There exist many kinds of three primary colors, for example, the three primary color space represented by R, G, B, the CIE three primary color space represented by L, A, B, the CIE three primary color space represented by L, U, V, and the like. Herein, R, G, B are selected as the chrominance signals of the three primary colors, and the received video signal is decoded to obtain intensity modulation signals of the R, G, B colors. Although color video signals, especially color TV signals, have different encoding modes and different color gamut of the three primary colors (phosphors) due to different formats they adopts, they can all be decoded to generate intensity modulation signals of R, G, B colors. Then color mapping can be performed on the R, G, B signals. More specifically, in the present invention, the received R, G, B signals are to be converted into chrominance signals in a target color gamut space through a luminance equation. A uniform color space such as the CIE space including CIE1976LAB space or CIE1976LUV space may be selected as the target color gamut space. Selecting a uniform color space is advantageous in that when color difference is larger than the visual resolution and is adequate for color difference between two adjacent levels in the Munsell color system, feeling to color of objects can be reflected better. The CIE1976LUV space is applicable to lighting, TV display, CRT display and other additive color mixture applications.

Additionally, the TV signal has a fixed color gamut which is a first color gamut, and each received TV signal is in the first color gamut. On the other hand, the television itself may display with laser or LED backlight which is in a second color gamut. The laser or LED backlight has a wider color gamut than the inherent first color gamut. Both the first and the second color gamut are shaped like a three-dimensional spindle.

Figure 3:
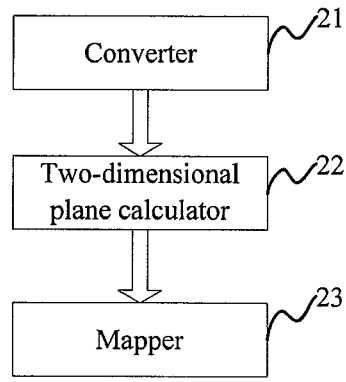
FIG. 3 is a schematic view of a color gamut mapping apparatus in an embodiment of a television according to the present invention.

Then the color gamut mapping apparatus performs color gamut mapping on the received TV signal and gives an output. As shown in FIG. 3, the color gamut mapping apparatus comprises a converter 21, a two-dimensional plane calculator 22 and a mapper 23.

The converter converts the received TV signal into a luminance signal and a chrominance signal, which is accomplished by the following steps:

1) converting the received TV signal into RGB signals. Multimedia equipment currently available, especially televisions, all use RGB signals to drive the display, so although video TV signals, especially color TV signals, have different encoding modes and different color gamut of the three primary colors (phosphor) due to different formats they adopts, the video signals can all be decoded to generate intensity modulation signals of R, G, B colors. Here, the RGB signals adopted in the present invention are just representative of video drive signals. Although examples in which other kinds of signals are used to drive multimedia equipment are not excluded herein, the RGB signals set forth herein will encompass any kinds of multimedia equipment drive signals regardless of the drive modes they adopt.

The received TV signal is converted into R, G and B coordinate signals, which are then connected with each other to form a triangle. Then signals within the region enclosed by the triangle are converted and calculated to obtain the first color gamut.

Likewise, display light of the television is converted into R, G and B coordinate signals, which are then connected with each other to form a triangle. Then signals within the region enclosed by the triangle are converted and calculated to obtain the second color gamut.

As the second color gamut is determined by inherent property of the display light of the multimedia equipment itself, the second color gamut may be obtained by performing a conversion on the display light and stored in advance, thereby to further increase the operational speed of the system and to perform subsequent color gamut mapping in a faster and better way.

In this embodiment, the color gamut mapping apparatus may further comprise a laser color gamut converting apparatus. The laser color gamut converting apparatus is configured to convert a laser wavelength of a television that displays with the laser to derive an R coordinate signal, a G coordinate signal and a B coordinate signal, which are then connected with each other to form a triangle. Signals within a region enclosed by the triangle are then converted into a color gamut space to derive the second color gamut. The color gamut mapping apparatus may convert the laser into the second color gamut in advance and stores the second color gamut therein for color gamut mapping of the television signal. The color gamut space is a CIELab space or a CIELuv space.

Of course, in consideration of synchronism of the subsequent color gamut mapping operations, the color gamut conversion may also be performed on the display light (i.e., laser) of the multimedia equipment and the received video signal simultaneously to obtain the second color gamut and the to-be-mapped point. Then the to-be-mapped point is mapped to the second color gamut to obtain the mapping point.

2) Selecting a color gamut type and converting the converted RGB signals into signals of the selected color gamut type. A uniform color space such as the CIE1976LAB space or CIE1976LUV space may be selected as the color gamut type. Selecting a uniform color space is advantageous in that when color difference is larger than the visual resolution and is adequate for color difference between two adjacent levels in the Munsell color system, feeling to color of objects can be reflected better. The CIE1976LUV space is applicable to lighting, TV display, image display (e.g., in a computer or a cell phone) and other additive color mixture applications. The first and the second color gamut belong to the same color gamut type. As the CIE color space is associated with the XYZ coordinate signals, XYZ coordinate signals are selected to represent the color signals of the three primary colors herein. If the selected color gamut type is associated with other coordinate signals, color signals of the three primary colors can be selected adaptively.

The RGB signals are converted into XYZ signals according to the following formula:

$$X = C_r x_r R + C_g x_g G + C_b x_b B \quad (a)$$
$$Y = C_r y_r R + C_g y_g G + C_b y_b B$$
$$Z = C_r z_r R + C_g z_g G + C_b z_b B$$

wherein:

$$\begin{bmatrix} C_r \\ C_g \\ C_b \end{bmatrix} = \begin{bmatrix} x_r & x_g & x_b \\ y_r & y_g & y_b \\ z_r & z_g & z_b \end{bmatrix}^{-1} \begin{bmatrix} x_n/y_n \\ 1 \\ z_n/y_n \end{bmatrix} \quad (b)$$

$C_r$, $C_g$ and $C_b$ are mapping component factors of the three primary colors, $x_r$, $y_r$ and $z_r$ are chrominance coordinates of the primary color (R), $x_g$, $y_g$ and $z_g$ are chrominance coordinates of the primary color (G), and $x_b$, $y_b$ and $z_b$ are chrominance coordinates of the primary color (B). By substituting the chrominance coordinates of the three primary colors RGB and the reference white chrominance coordinates into Formula (b), values of $C_r$, $C_g$ and $C_b$ can be derived.

Next, the XYZ signals obtained are expressed in the selected color gamut space.

If the selected color gamut space is CIE1976Lab, by substituting the color gamut conversion formula (a), we obtain:

$$L^* = \begin{cases} 116(Y/Y_n)^{1/3} - 16 & (Y/Y_n > 0.008856) \\ 903.3 Y/Y_n & (Y/Y_n <= 0.008856) \end{cases}$$

$$a^* = \begin{cases} 500[(X/X_n)^{1/3} - (Y/Y_n)^{1/3}] & (X/X_n > 0.008856) \\ 3893.5[X/X_n - Y/Y_n] & (X/X_n <= 0.008856) \end{cases}$$

$$b^* = \begin{cases} 200[(Y/Y_n)^{1/3} - (Z/Z_n)^{1/3}] & (Z/Z_n > 0.008856) \\ 1557.4[Y/Y_n - Z/Z_n] & (Z/Z_n <= 0.008856) \end{cases}$$

where L* denotes a lightness signal, a* and b* denote chrominance signals which are coordinates in the color space respectively.

If the selected color gamut space is CIE1976Luv, by substituting the color gamut conversion formula (a), we obtain:

$$L^* = \begin{cases} 116(Y/Y_n)^{1/3} - 16 & \text{If } Y/Y_n > 0.008856 \\ 903.3(Y/Y_n)^{1/3} & \text{If } Y/Y_n <= 0.008856 \end{cases}$$

$$u^* = 13 L^* (u' - u'_n)$$
$$v^* = 13 L^* (v' - v'_n)$$
$$u' = 4X / (X + 15Y + 3Z)$$
$$v' = 9Y / (X + 15Y + 3Z)$$
$$u'_n = 4X_n / (X_n + 15Y_n + 3Z_n)$$
$$v'_n = 9Y_n / (X_n + 15Y_n + 3Z_n)$$

where L* denotes a lightness signal, u* and v* denote chrominance signals which are coordinates in the color space respectively. $(X_n, Y_n, Z_n)$ denote white tristimulus values reflected into a viewer's eyes when a CIE standard illuminator illuminates a full reflector, where $Y_n = 100$.

The method of converting a received TV signal into a luminance signal and a chrominance signal according to the present invention described above has an advantage that it can perform uniform color conversion on video signals, especially TV signals, of different formats all over the word.

The two-dimensional plane calculator 22 is configured to calculate a two-dimensional plane according to the chrominance signal. The two-dimensional plane intersects the first color gamut to obtain a first region and intersects the second color gamut to obtain a second region. The two-dimensional plane may be a two-dimentional lightness-chromaticity plane, a two-dimensional lightness-hue angle plane or a two-dimensional hue angle-chromaticity plane.

In case of a two-dimensional lightness-chromaticity plane, if the selected color gamut space is the CIE1976Lab space, the two-dimensional plane is obtained according to the hue angle $n=\arctan b^*/a^*$; and if the selected color gamut space is the CIE1976Luv space, the two-dimensional plane is obtained according to the hue angle $n=\arctan v^*/u^*$.

In case of a two-dimensional lightness-hue angle plane, if the selected color gamut space is the CIE1976Lab space, the two-dimensional plane is obtained according to the chromaticity $C^*=(a^{*2}+b^{*2})^{1/2}$; and if the selected color gamut space is the CIE1976Luv space, the two-dimensional plane is obtained according to the chromaticity $C^*=(u^{*2}+v^{*2})^{1/2}$.

In case of a two-dimensional hue angle-chromaticity plane, if the selected color gamut space is the CIE1976Lab space, the two-dimensional plane is obtained according to the lightness signal; and if the selected color gamut space is the CIE1976Luv space, the two-dimensional plane is obtained also according to the lightness signal.

To obtain the desired two-dimensional plane in a faster and better way, a one-dimensional look-up table may be created for the two-dimensional plane. More specifically, the look-up table divides an angular range [0, 360°] of the two-dimensional plane into h equant two-dimensional planes, each corresponding to an angle of 360°/h, where $h \geq 360n$, $n \geq 1$ and h is an integer. If a two-dimensional lightness-chromaticity plane is selected, a hue angle is calculated for each two-dimensional plane, so a corresponding two-dimensional plane can be derived directly from the hue angle. If a lightness-hue angle two-dimensional plane is selected, a chromaticity is calculated for each two-dimensional plane, so a corresponding two-dimensional plane can be derived directly from the chromaticity. Likewise, if a lightness-chromaticity two-dimensional plane is selected, a hue angle is calculated for each two-dimensional plane, and a corresponding two-dimensional plane can be derived directly from the lightness. In case calculated hue angle data does not appear in the look-up table when the two-dimensional lightness-chromaticity plane is selected, an interpolation may be performed on the calculated hue angle data, a hue angle closest to this hue angle is searched in the one-dimensional look-up table, and then a two-dimensional plane is obtained according to the found hue angle. Similarly, the interpolation operation may be applied to two-dimensional planes of other kinds.

The one-dimensional look-up table and data of the two-dimensional plane in the look-up table may be calculated in advance and stored in a signal processing system of the multimedia equipment.

Figure 4:
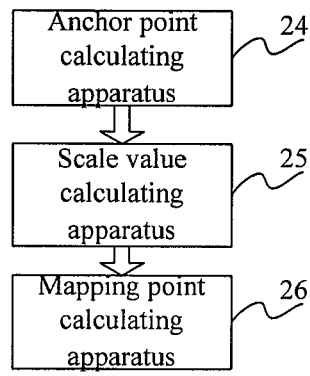
FIG. 4 is a schematic view of a mapper in an embodiment of the television according to the present invention.

The mapper 23 is configured to calculate location of a to-be-mapped point corresponding to the TV signal in the first region according to the luminance signal and the chrominance signal obtained from the converter, and to calculate a mapping point in the second region according to the to-be-mapped point to output a mapping point signal. The two-dimensional plane intersects the first color gamut to obtain a first region, and intersects the second color gamut to obtain a second region. As shown in FIG. 4, the mapper further comprises: an anchor point calculating apparatus 24, a scale value calculating apparatus 25 and a mapping point calculating apparatus 26. The anchor point calculating apparatus 24 is configured to calculate an anchor point in the two-dimensional lightness-chromaticity plane. The anchor point is calculated by calculating points with the largest horizontal coordinates in the first region and the second region respectively and connecting the calculated points with a line, then a point where the line intersects the longitudinal axis is defined as the anchor point. Taking a two dimensional lightness-chromaticity plane as an example, points with the largest chromaticity coordinates in the first region and the second regions can be calculated respectively and connected by a line, then a point where this line intersects the lightness axis is defined as an anchor point. The scale value calculating apparatus 25 is configured to calculate the scale value, which is then multiplied with the to-be-matched point to derive the mapping point. The scale value is calculated in the following way: a line from the anchor point to the to-be-mapped point intersects a boundary of the first region at a first boundary point and intersects a boundary of the second region at a second boundary point, and a ratio of a distance between the anchor point and the second boundary point to that between the anchor point and the first boundary point is defined as the scale value. Referring to FIG. 2 for more details, in the two-dimensional lightness-chromaticity plane, a horizontal axis C* represents the chromaticity axis while a longitudinal axis L* represents the lightness axis. A first region A has a point V1 with the largest chromaticity coordinate, and a second region B has a point V2 with the largest chromaticity coordinate. A line is drawn from the point V1 to the point V2, and a point R where this line intersects the lightness axis L* is defined as the anchor point. In this two-dimensional plane, location of the to-be-mapped point E is known; to be more specific, its location is represented by the L*, a* and b* signals already calculated previously. A line connecting the anchor point R and the to-be-mapped point E intersects a boundary of the first region A at a first boundary point F, and intersects a boundary of the second region B at a second boundary point G. A scale value K is defined as a ratio of a distance between the anchor point R and the second boundary point G to that between the anchor point R and the first boundary point F. The mapping point calculating apparatus 26 is configured to derive location of the mapping point by multiplying the to-be-mapped point E with the scale value K obtained from the scale value calculating apparatus 25.

To accelerate the processing operations of the system and find the corresponding scale value as quickly as possible, an angular range of [−90°, 90°] of the scale value in the two-dimensional plane is divided into m sub-ranges, where $m \geq 180n$, $n \geq 1$ and m is an integer. All scale values are calculated and stored in advance, and then an angle included between the line from the anchor point R to the to-be-mapped point E and a horizontal line crossing the anchor point R is calculated to derive a corresponding scale value. Here, the range of [−90°, 90°] is defined by taking the anchor point R as an imaginary origin. The angle included between the line from the anchor point R to the to-be-mapped point E and a horizontal line crossing the anchor R can be calculated directly. Alternatively, a coordinate transform may be conducted on the entire two-dimensional plane to obtain data that is based on the imaginary origin R, from which the scale value and location of the matching point are derived. Then an inverse coordinate transform is conducted to revert to coordinates in the original plane.

In this way, by combining the one-dimensional look-up table created for the two-dimensional plane with the data and scale values thus obtained, a two-dimensional look-up table can be created. In the television of this embodiment, a two-dimensional look-up table apparatus may be further provided. The two-dimensional look-up table apparatus stores data of the two-dimensional plane and the scale values in advance. Then a corresponding scale value can be retrieved according to the received TV signal. Taking the two-dimensional lightness-chromaticity plane as an example, data of the two-dimensional plane can be derived from a hue angle, and a scale value is derived from the angle included between the line from the anchor point and the to-be-mapped point and the horizontal line crossing the anchor. Then location of a mapping point in the second color gamut is derived from the scale value, and a mapping point signal is outputted. At this time, as the mapping point signal may still be in form of LAB signals, an additional inverse transform apparatus is needed which conducts an inverse transform on the LAB signals to obtain RGB signals for output to a display screen. The inverse transform operations are in one-to-one correspondence to the transform operations for transforming the RGB signals into the LAB signals.

What described above only illustrates embodiments of the present invention, and it should be appreciated that, the present invention are also applicable to other multimedia equipment such as computer displays, displays of electronic picture frames, cell phone displays and the like. Scope of the present invention is not limited to what described herein; rather, changes or substitutions that may readily occur to those skilled in the art based on the disclosure of the present invention will still fall within the scope of the present invention. Therefore, the scope of the present invention is only defined by the Claims.

What is claimed is:

1. A color gamut mapping method for multimedia equipment, the method performing color gamut mapping on a video signal received by the multimedia equipment and giving an output, wherein the video signal is in a first color gamut, while display light of the multimedia equipment is in a second color gamut, being characterized in that the color gamut mapping method for multimedia equipment comprises the steps of:
    converting the received video signal into a luminance signal and a chrominance signal, and calculating a two-dimensional lightness-chromaticity plane according to the luminance signal and the chrominance signal, wherein the two-dimensional plane intersects the first color gamut to obtain a first region and intersects the second color gamut to obtain a second region; and
    calculating location of a to-be-mapped point corresponding to the video signal in the first region according to the luminance signal and the chrominance signal of the video signal, and calculating a mapping point in the second region by making calculations on the to-be-mapped point to output a mapping point signal, wherein calculating the mapping point comprises:
        calculating points with the largest coordinates in the first region and the second region respectively and connecting the calculated points with a line, wherein a point where the line intersects the lightness axis is defined as an anchor point;
        drawing a line from the anchor point to the to-be-mapped point, which intersects a boundary of the first region at a first boundary point and intersects a boundary of the second region at a second boundary point, wherein a ratio of a distance between the anchor point and the second boundary point to that between the anchor point and the first boundary point is defined as a scale value; and
        deriving the mapping point by multiplying the to-be-mapped point with the scale value.

2. The color gamut mapping method for multimedia equipment of claim 1, being characterized in that:
    the first color gamut and the second color gamut are a CIELab space or a CIELuv space;
    if the first color gamut and the second color gamut are a CIELab space, the video signal is represented by L*, a* and b* signals, wherein L* represents the lightness signal, a* and b* represent the chrominance signal, the chromaticity signal is represented by $C^*=(a^{*2}+b^{*2})^{1/2}$, and the L* and C* form the two-dimensional lightness-chromaticity plane coordinates, and wherein the two-dimensional plane is derived according to a hue angle n=arctan b*/a*;
    if the first color gamut and the second color gamut are a CIELuv space, the video signal is represented by L*, u* and v* signals, wherein L* represents the lightness signal, u* and v* represent the chrominance signal, the chromaticity signal is represented by $C^*=(u^{*2}+v^{*2})^{1/2}$, and the L* and C* form two-dimensional lightness-chromaticity plane coordinates, and wherein the two-dimensional plane is derived according to a hue angle n=arctan v*/u*.

3. The color gamut mapping method for multimedia equipment of claim 2, being characterized in that:
    an angular range [0, 360°] of the two-dimensional plane is divided into h equant parts, each corresponding to an angle of 360°/h, and the hue angle is calculated to derive a corresponding two-dimensional plane, where h≧360n, n≧1;
    an angular range of [−90°, 90°] of the scale value is divided into m sub-ranges, where m≧180n, n≧1, wherein the scale value is calculated and stored in advance, and an angle included between a line from the anchor point to the to-be-mapped point and a horizontal line crossing the anchor point is calculated to derive a corresponding scale value;
    according to the hue angle as well as the angle included between the line from the anchor point to the to-be-mapped point and the horizontal line crossing the anchor point, a two-dimensional look-up table is created to obtain a corresponding scale value.

4. The color gamut mapping method for multimedia equipment of claim 1, being characterized in that:
    conversion is made on the display light of the multimedia equipment to derive an R coordinate signal, a G coordinate signal, and a B coordinate signal which are then connected with each other to form a triangle, and signals within a region enclosed by the triangle are converted and calculated to obtain the second color gamut.

5. The color gamut mapping method for multimedia equipment of claim 4, being characterized in that:
    the second color gamut is obtained in advance by converting the display light of the multimedia equipment, and then stored for color gamut mapping of the video signal;
    or the color gamut conversion is performed on the display light of the multimedia equipment and the video signal simultaneously to obtain the second color gamut and the to-be-mapped point, and then the to-be-mapped point is mapped to the second color gamut to derive the mapping point.

6. The color gamut mapping method for multimedia equipment of claim 1, being characterized in that:

the received video signal is decoded to obtain RGB chrominance signals;

the RGB chrominance signals are converted into chrominance signals in the first color gamut, wherein the chrominance signals in the first color gamut are chrominance signals associated with XYZ chrominance signals, and the RGB chrominance signals are converted into the XYZ chrominance signals according to the following formula:

$$R = \frac{y_g z_b - y_b z_g}{C_r \Delta} X + \frac{x_b z_g - x_g z_b}{C_r \Delta} Y + \frac{x_g y_b - x_b y_g}{C_r \Delta} Z$$

$$G = \frac{y_b z_r - y_r z_b}{C_g \Delta} X + \frac{x_r z_b - x_b z_r}{C_g \Delta} Y + \frac{x_b y_r - x_r y_b}{C_g \Delta} Z$$

$$B = \frac{y_r z_g - y_g z_r}{C_b \Delta} X + \frac{x_g z_r - x_r z_g}{C_b \Delta} Y + \frac{x_r y_g - x_g y_r}{C_b \Delta} Z$$

$$\Delta = r_x(g_y b_z - g_z b_y) + r_y(g_z b_x - g_x b_z) + r_z(g_x b_y - g_y b_x),$$

$$\begin{bmatrix} C_r \\ C_g \\ C_b \end{bmatrix} = \begin{bmatrix} x_r & x_g & x_b \\ y_r & y_g & y_b \\ z_r & z_g & z_b \end{bmatrix}^{-1} \begin{bmatrix} x_n/y_n \\ 1 \\ z_n/y_n \end{bmatrix}$$

$$Y = C_r y_r R + C_g y_g G + C_b y_b B$$

where $C_r$, $C_g$ and $C_b$ are mapping component factors of the three primary colors RGB, $x_r$, $y_r$ and $z_r$, are chrominance coordinates of the primary color R, $x_g$, $y_g$ and $z_g$ are chrominance coordinates of the primary color G, and $x_b$, $y_b$ and $z_b$ are chrominance coordinates of the primary color B.

7. The color gamut mapping method for multimedia equipment of claim 6, being characterized in that:

the first color gamut is a CIELab color gamut space, and chrominance signals in the CIELab color gamut space are associated with the XYZ chrominance signals in the following relationship:

$$L^* = \begin{cases} 116(Y/Y_n)^{1/3} - 16 & (Y/Y_n > 0.008856) \\ 903.3Y/Y_n & (Y/Y_n <= 0.008856) \end{cases}$$

$$a^* = \begin{cases} 500[(X/X_n)^{1/3} - (Y/Y_n)^{1/3}] & (X/X_n > 0.008856) \\ 3893.5[X/X_n - Y/Y_n] & (X/X_n <= 0.008856) \end{cases}$$

$$b^* = \begin{cases} 200[(Y/Y_n)^{1/3} - (Z/Z_n)^{1/3}] & (Z/Z_n > 0.008856) \\ 1557.4[Y/Y_n - Z/Z_n] & (Z/Z_n <= 0.008856) \end{cases}$$

where L* represents the lightness signal, and a* and b* represent the chrominance signals.

8. The color gamut mapping method for multimedia equipment of claim 6, being characterized in that: the first color gamut is a CIELuv color gamut space, and chrominance signals in the CIELuv color gamut space are associated with the XYZ chrominance signals in the following relationship:

$$L^* = \begin{cases} 116(Y/Y_n)^{1/3} - 16 & \text{If } Y/Y_n > 0.008856 \\ 903.3(Y/Y_n)^{1/3} & \text{If } Y/Y_n <= 0.008856 \end{cases}$$

$$u^* = 13L^*(u' - u'_n)$$

$$v^* = 13L^*(v' - v'_n)$$

$$u' = 4X/(X + 15Y + 3Z)$$

-continued $$v' = 9Y/(X + 15Y + 3Z)$$

$$u'_n = 4X_n/(X_n + 15Y_n + 3Z_n)$$

$$v'_n = 9Y_n/(X_n + 15Y_n + 3Z_n)$$

where L* represents the lightness signal, u' and v' represent the chrominance signals in the first color gamut, and $u'_n$ and $v'_n$ represent the chrominance signals in the second color gamut.

9. A television comprising a color gamut mapping apparatus for performing color gamut mapping on a received television signal and giving an output, the television signal is in a first color gamut, while the television displays an image with laser that is in a second color gamut, being characterized in that the color gamut mapping apparatus comprises:

a converter, configured to convert the received television signal into a luminance signal and a chrominance signal;

a two-dimensional plane calculator, configured to calculate a two-dimensional lightness-chromaticity plane according to the chrominance signal, wherein the two-dimensional plane intersects the first color gamut to obtain a first region and intersects the second color gamut to obtain a second region; and a mapper, configured to calculate a to-be-mapped point corresponding to the television signal in the first region according to the luminance signal and the chrominance signal obtained from the converter, and calculate a mapping point in the second region according to the to-be-mapped point to output a mapping point signal, the mapper comprising:

an anchor point calculating apparatus, configured to calculate an anchor point in the two-dimensional lightness-chromaticity plane, wherein the anchor point is calculated by calculating a point with the largest chromaticity in the first region and a point with the largest chromaticity in the second region respectively and connecting the calculated points with a line, then a point where the line intersects the lightness axis is defined as the anchor point; and a scale value calculating apparatus, configured to calculate the scale value, which is then multiplied with the to-be-matched point to derive the mapping point, wherein the scale value is calculated in the following way: a line from the anchor point to the to-be-mapped point intersects a boundary of the first region at a first boundary point and intersects a boundary of the second region at a second boundary point, and a ratio of a distance between the anchor point and the second boundary point to that between the anchor point and the first boundary point is defined as the scale value.

10. The television of claim 9, being characterized in that:

said color gamut mapping apparatus further comprises a laser color gamut converting apparatus, being configured to convert a wavelength of the laser to derive an R coordinate signal, a G coordinate signal and a B coordinate signal of the laser which are then connected with each other to form a triangle, and configured to convert signals within a region enclosed by the triangle into a color gamut space to derive the second color gamut, wherein the color gamut mapping apparatus converts the laser into the second color gamut in advance and stores the second color gamut therein for color gamut mapping of the television signal, and wherein the color gamut space is a CIELab space or a CIELuv space, if the first color gamut and the second color gamut are a CIELab space, the television signal is represented by L*, a* and b* signals, wherein L* represents the lightness signal, a* and b* represent the chrominance signal, the chromaticity signal is represented by $C^* = (a^{*2} + b^{*2})^{1/2}$, and the L* and C* form two-dimensional lightness-chromaticity plane coordinates, and wherein the two-dimensional plane is derived according to a hue angle n=arctan b*/a*;

if the first color gamut and the second color gamut are a CIELuv space, the video signal is represented by L*, u* and v* signals, wherein L* represents the lightness signal, u* and v* represent the chrominance signal, the chromaticity signal is represented by $C^* = (u^{*2} + v^{*2})^{1/2}$, and the L* and C* form two-dimensional lightness-chromaticity plane coordinates, and wherein the two-dimensional plane is derived according to a hue angle n=arctan v*/u*.

11. The television of claim 10, being characterized in that:
said color gamut mapping apparatus further comprises a two-dimensional look-up table configured to look up a corresponding scale value according to the received television signal;
the two-dimensional look-up table is as follows: an angular range [0, 360°] of the two-dimensional plane is divided into h equant parts, each corresponding to an angle of 360°/h, and the hue angle is calculated to derive a corresponding two-dimensional plane, where h≧360n, n≧1; an angular range of [−90°, 90°] of the scale value is divided into m sub-ranges, where m≧180n, n≧1;, wherein the scale value is calculated and stored in advance, and an angle included between a line from the anchor point to the to-be-mapped point and a horizontal line crossing the anchor point is calculated to derive a corresponding scale value.

12. The television of claim 9, being characterized in that the television comprises:
an RGB signal converting apparatus, configured to convert the received television signal into RGB chrominance signals;
an adjusting apparatus, configured to convert the RGB chrominance signals into chrominance signals in the first color gamut, wherein the chrominance signals in the first color gamut are chrominance signals associated with XYZ chrominance signals, and the RGB chrominance signals are converted into the XYZ chrominance signals according to the following formula:

$$R = \frac{y_g z_b - y_b z_g}{C_r \Delta} X + \frac{x_b z_g - x_g z_b}{C_r \Delta} Y + \frac{x_g y_b - x_b y_g}{C_r \Delta} Z$$

$$G = \frac{y_b z_r - y_r z_b}{C_g \Delta} X + \frac{x_r z_b - x_b z_r}{C_g \Delta} Y + \frac{x_b y_r - x_r y_b}{C_g \Delta} Z$$

$$B = \frac{y_r z_g - y_g z_r}{C_b \Delta} X + \frac{x_g z_r - x_r z_g}{C_b \Delta} Y + \frac{x_r y_g - x_g y_r}{C_b \Delta} Z$$

$$\Delta = r_x(g_y b_z - g_z b_y) + r_y(g_z b_x - g_x b_z) + r_z(g_x b_y - g_y b_x),$$

$$\begin{bmatrix} C_r \\ C_g \\ C_b \end{bmatrix} = \begin{bmatrix} x_r & x_g & x_b \\ y_r & y_g & y_b \\ z_r & z_g & z_b \end{bmatrix}^{-1} \begin{bmatrix} x_n/y_n \\ 1 \\ z_n/y_n \end{bmatrix}$$

$$Y = C_r y_r R + C_g y_g G + C_b y_b B$$

where $C_r$, $C_g$ and $C_b$ are mapping component factors of the three primary colors RGB, $x_r$, $y_r$ and $z_r$ are chrominance coordinates of the primary color R, $x_g$, $y_g$ and $z_g$ are chrominance coordinates of the primary color G, and $x_b$, $y_b$ and $z_b$ are chrominance coordinates of the primary color B.

13. The television of claim 12, being characterized in that: the first color gamut is a CIELab color gamut space, and chrominance signals in the CIELab color gamut space are associated with the XYZ chrominance signals in the following relationship:

$$L^* = \begin{cases} 116(Y/Y_n)^{1/3} - 16 & (Y/Y_n > 0.008856) \\ 903.3 Y/Y_n & (Y/Y_n \leq 0.008856) \end{cases}$$

$$a^* = \begin{cases} 500[(X/X_n)^{1/3} - (Y/Y_n)^{1/3}] & (X/X_n > 0.008856) \\ 3893.5[X/X_n - Y/Y_n] & (X/X_n \leq 0.008856) \end{cases}$$

$$b^* = \begin{cases} 200[(Y/Y_n)^{1/3} - (Z/Z_n)^{1/3}] & (Z/Z_n > 0.008856) \\ 1557.4[Y/Y_n - Z/Z_n] & (Z/Z_n \leq 0.008856) \end{cases}$$

where L* represents the lightness signal, and a* and b* represent the chrominance signals.

14. The television of claim 12, being characterized in that: the first color gamut is a CIELuv color gamut space, and chrominance signals in the CIELuv color gamut space are associated with the XYZ chrominance signals in the following relationship:

$$L^* = \begin{cases} 116(Y/Y_n)^{1/3} - 16 & \text{If } Y/Y_n > 0.008856 \\ 903.3(Y/Y_n)^{1/3} & \text{If } Y/Y_n \leq 0.008856 \end{cases}$$

$$u^* = 13L^*(u' - u'_n)$$

$$v^* = 13L^*(v' - v'_n)$$

$$u' = 4X/(X + 15Y + 3Z)$$

$$v' = 9Y/(X + 15Y + 3Z)$$

$$u'_n = 4X_n/(X_n + 15Y_n + 3Z_n)$$

$$v'_n = 9Y_n/(X_n + 15Y_n + 3Z_n)$$

where L* represents the lightness signal, u' and v' represent the chrominance signals in the first color gamut, and $u'_n$ and $v'_n$ represent the chrominance signals in the second color gamut.

15. A color processing apparatus for performing color gamut mapping on a received video signal and giving an output, wherein the video signal is in a first color gamut, and the color processing apparatus further has a second color gamut, the color processing apparatus comprising:
a converter, configured to convert the received video signal into a luminance signal and a chrominance signal;
a two-dimensional plane calculator, configured to calculate a two-dimensional lightness-chromaticity plane according to the luminance signal and the chrominance signal, wherein the two-dimensional plane intersects the first color gamut to obtain a first region and intersects the second color gamut to obtain a second region; and
a mapper, configured to calculate location of a to-be-mapped point corresponding to the video signal in the first region according to the luminance signal and the chrominance signal obtained from said converter, and calculate a mapping point in the second region according to the to-be-mapped point to output a mapping point signal, the mapper comprising:

an anchor point calculating apparatus, configured to calculate an anchor point in the two-dimensional lightness-chromaticity plane, wherein the anchor point is calculated by calculating a point with the largest chromaticity in the first region and a point with the largest chromaticity in the second region respectively and connecting the calculated points with a line, then a point where the line intersects the lightness axis is defined as the anchor point; and a scale value calculating apparatus, configured to calculate the scale value, which is then multiplied with the to-be-matched point to derive the mapping point, wherein the scale value is calculated in the following way: a line from the anchor point to the to-be-mapped point intersects a boundary of the first region at a first boundary point and intersects a boundary of the second region at a second boundary point, and a ratio of a distance between the anchor point and the second boundary point to that between the anchor point and the first boundary point is defined as the scale value.

16. The color processing apparatus of claim 15, being characterized in that:

the color gamut space is a CIELab space or a CIELuv space, if the first color gamut and the second color gamut are a CIELab space, the television signal is represented by L*, a* and b* signals, wherein L* represents the lightness signal, a* and b* represent the chrominance signal, the chromaticity signal is represented by $C^* = (a^{*2} + b^{*2})^{1/2}$, and the L* and C* form two-demensional lightness-chromaticity plane coordinates, and wherein the two-dimensional plane is derived according to a hue angle n=arctan b*/a*;

if the first color gamut and the second color gamut are a CIELuv space, the video signal is represented by L*, u* and v* signals, wherein L* represents the lightness signal, u* and v* represent the chrominance signal, the chromaticity signal is represented by $C^* = (u^{*2} + v^{*2})^{1/2}$, and the L* and C* form two-dimensional lightness-chromaticity plane coordinates, and wherein the two-dimensional plane is derived according to a hue angle n=arctan v*/u*.

17. The color processing apparatus of claim 15, being characterized in that the color processing apparatus comprises:

an RGB signal converting apparatus, configured to convert the received video signal into RGB chrominance signals;

an adjusting apparatus, configured to convert the RGB chrominance signals into chrominance signals in the first color gamut, wherein the chrominance signals in the first color gamut are chrominance signals associated with XYZ chrominance signals, and the RGB chrominance signals are converted into the XYZ chrominance signals according to the following formula:

$$R = \frac{y_g z_b - y_b z_g}{C_r \Delta} X + \frac{x_b z_g - x_g z_b}{C_r \Delta} Y + \frac{x_g y_b - x_b y_g}{C_r \Delta} Z$$

$$G = \frac{y_b z_r - y_r z_b}{C_g \Delta} X + \frac{x_r z_b - x_b z_r}{C_g \Delta} Y + \frac{x_b y_r - x_r y_b}{C_g \Delta} Z$$

$$B = \frac{y_r z_g - y_g z_r}{C_b \Delta} X + \frac{x_g z_r - x_r z_b}{C_b \Delta} Y + \frac{x_r y_g - x_g y_r}{C_b \Delta} Z$$

$$\Delta = r_x(g_y b_z - g_z b_y) + r_y(g_z b_x - g_x b_z) + r_z(g_x b_y - g_y b_x),$$

$$\begin{bmatrix} C_r \\ C_g \\ C_b \end{bmatrix} = \begin{bmatrix} x_r & x_g & x_b \\ y_r & y_g & y_b \\ z_r & z_g & z_b \end{bmatrix}^{-1} \begin{bmatrix} x_n/y_n \\ 1 \\ z_n/y_n \end{bmatrix}$$

$$Y = C_r y_r R + C_g y_g G + C_b y_b B$$

where $C_r$, $C_g$ and $C_b$, are mapping component factors of the three primary colors RGB, $x_r$, $y_r$ and $z_r$, are chrominance coordinates of the primary color R, $x_g$, $y_g$ and $z_g$ are chrominance coordinates of the primary color G, and $x_b$, $y_b$ and $z_b$ are chrominance coordinates of the primary color B.

* * * * *